(12) United States Patent
Yoshida et al.

(10) Patent No.: US 12,503,575 B2
(45) Date of Patent: Dec. 23, 2025

(54) FINE HOLLOW PARTICLES COMPRISING MELAMINE-BASED RESIN

(71) Applicants: KAGOSHIMA UNIVERSITY, Kagoshima (JP); Tokuyama Corporation, Shunan (JP)

(72) Inventors: Masahiro Yoshida, Kagoshima (JP); Takayuki Takei, Kagoshima (JP); Yoshihiro Ohzuno, Kagoshima (JP); Kengo Nishio, Izumiotsu (JP); Yasutomo Shimizu, Tsukuba (JP); Kazuishi Fukuda, Tsukuba (JP); Takayoshi Kawasaki, Tsukuba (JP)

(73) Assignees: KAGOSHIMA UNIVERSITY, Kagoshima (JP); TOKUYAMA CORPORATION, Shunan (JP)

( * ) Notice: Subject to any disclaimer, the term of this patent is extended or adjusted under 35 U.S.C. 154(b) by 102 days.

(21) Appl. No.: 18/274,389

(22) PCT Filed: Jan. 27, 2022

(86) PCT No.: PCT/JP2022/003185
§ 371 (c)(1),
(2) Date: Jul. 26, 2023

(87) PCT Pub. No.: WO2022/163781
PCT Pub. Date: Aug. 4, 2022

(65) Prior Publication Data
US 2024/0301171 A1    Sep. 12, 2024

(30) Foreign Application Priority Data

Jan. 29, 2021 (JP) .................................. 2021-012744
May 14, 2021 (JP) .................................. 2021-082732

(51) Int. Cl.
| | |
|---|---|
| C08K 7/22 | (2006.01) |
| B01J 13/16 | (2006.01) |
| B24B 37/24 | (2012.01) |

(52) U.S. Cl.
CPC ................. C08K 7/22 (2013.01); B01J 13/16 (2013.01); B24B 37/24 (2013.01); *C08K 2201/003* (2013.01)

(58) Field of Classification Search
CPC ............ C08G 18/3814; C08G 18/4277; C08G 18/7621; C08G 18/6674; C08G 18/10;
(Continued)

(56) References Cited

U.S. PATENT DOCUMENTS 4,610,927 A    9/1986   Igarashi et al.
5,360,832 A    11/1994  Bito et al.
(Continued)

FOREIGN PATENT DOCUMENTS

CN    1447735 A     10/2003
CN    106140039 A   11/2016
(Continued)

OTHER PUBLICATIONS

International Search Report for PCT/JP2022/003185 (PCT/ISA/210) mailed on Apr. 5, 2022.
(Continued)

*Primary Examiner* — Monica A Huson
(74) *Attorney, Agent, or Firm* — Birch, Stewart, Kolasch & Birch, LLP

(57) ABSTRACT

The fine hollow particle of the present invention is a fine hollow particle composed of a resin film comprising a melamine-based resin, in which the resin film is composed of a plurality of small piece-shaped portions and a bonding portion for bonding the plurality of small piece-shaped portions. According to the present invention, it is possible to
(Continued)

provide stable fine hollow particles having excellent solvent resistance and heat resistance, good dispersibility, and a large particle diameter.

8 Claims, 2 Drawing Sheets

(58) Field of Classification Search
CPC ............... C08G 12/38; C08G 18/4854; C08G 18/3206; C08G 18/667; C08G 2110/0083; C08G 2110/0066; C08L 61/28; C08L 75/04; B01J 13/16; B24B 37/24; C08K 7/22; C08K 2201/003
See application file for complete search history.

(56) References Cited

U.S. PATENT DOCUMENTS

| | | |
|---|---|---|
| 2004/0003895 A1 | 1/2004 | Amano et al. |
| 2012/0292552 A1 | 11/2012 | Steinke et al. |
| 2017/0065956 A1 | 3/2017 | Lentz et al. |
| 2023/0151179 A1 | 5/2023 | Shimizu et al. |

FOREIGN PATENT DOCUMENTS

| | | | |
|---|---|---|---|
| JP | 60-64627 | A | 4/1985 |
| JP | 3-239735 | A | 10/1991 |
| JP | 4-304220 | A | 10/1992 |
| JP | 7-41594 | A | 2/1995 |
| JP | 2003-55422 | A | 2/2003 |
| JP | 2008-252017 | A | 10/2008 |
| JP | 2009-202123 | A | 9/2009 |
| JP | 2009-279680 | A | 12/2009 |
| JP | 2015-193060 | A | 11/2015 |
| JP | 2016-196057 | A | 11/2016 |
| JP | 2017-218519 | A | 12/2017 |
| JP | 2019-63903 | A | 4/2019 |
| JP | 2019-167455 | A | 10/2019 |
| JP | 2020-151713 | A | 9/2020 |
| TW | 201636406 | | 10/2016 |
| WO | WO 2021/201088 | A1 | 10/2021 |

OTHER PUBLICATIONS

Bai et al., "CO2 Pickering emulsion in water templated hollow porous sorbents for fast and highly selective uranium extraction," Chemical Engineering Journal, vol. 387, 2020, pp. 1-12.

Extended European Search Report for corresponding European Application No. 22746000.3, dated Dec. 13, 2024.

He et al., "The preparation of composite microsphere with hollow core/porous shell structure by self-assembling of latex particles at emulsion droplet interface," Journal of Colloid and Interface Science, vol. 299, 2006, pp. 791-796.

Chinese Office Action and Search Report for Chinese Application No. 202280011563.3, dated Jul. 4, 2025, with English translation.

FINE HOLLOW PARTICLES COMPRISING MELAMINE-BASED RESIN

TECHNICAL FIELD

The present invention relates to a novel fine hollow particle made of a melamine-based resin.

BACKGROUND ART

Fine hollow particles are used in many fields, such as agricultural chemicals, pharmaceuticals, perfumes, liquid crystals, adhesives, electronic material parts, and building materials. In particular, in recent years, fine hollow particles have been studied for the purpose of providing pores in a Chemical Mechanical Polishing (CMP) polishing pad made of polyurethane (urea) used for wafer polishing. Such fine hollow particles are required to have excellent solvent resistance and heat resistance, and to have preferable control of particle size. In particular, in the field of CMP polishing pads, monodispersed fine hollow particles having a relatively large particle diameter of about 20 to 50 μm are desired in order to achieve a high polishing rate and atomic-level flatness.

Therefore, PTL 1 discloses a method for producing fine hollow particles made of a melamine resin, which is a thermosetting resin having excellent heat resistance and solvent resistance.

CITATION LIST

Patent Literature

PTL 1: JPH7-41594 A

SUMMARY OF INVENTION

Technical Problem

However, in the method of PTL 1, although heat resistance and solvent resistance are excellent, there is a problem from the viewpoint of controlling the particle size and the dispersibility thereof.

Accordingly, an object of the present invention is to provide a novel fine hollow particle which has excellent solvent resistance and heat resistance and good dispersibility and can easily produce a stable fine hollow body having a large particle size.

Solution to Problem

As a result of intensive studies to solve the above problems, the present inventors have found that novel fine hollow particles which are fine hollow particles composed of a resin film comprising a melamine-based resin and in which the resin film is composed of a plurality of small piece-shaped portions and a bonding portion for bonding the plurality of small piece-shaped portions solve the above problems, and have thus completed the present invention.

That is the present invention relates to the following [1] to [8].

[1] A fine hollow particle composed of a resin film comprising a melamine-based resin, wherein the resin film comprises a plurality of small piece-shaped portions and a bonding portion for bonding the plurality of small piece-shaped portions.

[2] The fine hollow particle as set forth in [1], in which the small piece-shaped portion has at least one shape selected from the group consisting of a substantially circular plate shape, a substantially elliptical sphere shape, and a substantially spherical shape.

[3] The fine hollow particle as set forth in [1] or [2], in which the small piece-shaped portion has a longest diameter of 1 μm to 20 μm.

[4] The fine hollow particle as set forth in any one of [1] to [3], in which the fine hollow particle composed of the resin film comprising the melamine-based resin has a particle diameter of 10 μm to 100 μm.

[5] A cured body comprising the fine hollow particle according to any one of [1] to [4] dispersed in a polyurethane resin.

[6] A CMP polishing pad including the cured body as set forth in [5].

[7] A method for producing a fine hollow particle composed of a resin film comprising a melamine-based resin, the method including:
a first step: a step of preparing (a) an oil phase of an organic solvent;
a second step: a step of preparing (b) a water phase containing a surfactant;
a third step: a step of mixing and stirring the oil phase and the water phase to prepare an O/W emulsion in which the water phase forms a continuous phase and the oil phase forms a dispersed phase;
a fourth step: a step of adding a melamine formaldehyde prepolymer compound as an additional phase to the O/W emulsion and promoting a condensation reaction of methylolated melamine, which is a melamine formaldehyde prepolymer compound, on the interface of the O/W emulsion to form a resin film to form a fine particle and obtain a fine particle dispersion liquid in which the fine particle is dispersed;
a fifth step: a step of separating the fine particle from the fine particle dispersion liquid; and
a sixth step: a step of removing the oil phase from the inside of the fine particle to obtain the fine hollow particle, in which a weight ratio of the (a) oil phase of the organic solvent [component (a)] to the (b) water phase containing the surfactant [component (b)] is 100 to 500 parts by mass of component (b), per 100 parts by mass of the component (a).

[8] The method as set forth in [7], in which the organic solvent used in the (a) oil phase of the organic solvent is selected from organic solvents having a boiling point of 100° C. to 180° C.

Advantageous Effects of Invention

The fine hollow particle of the present invention is characterized in that it is a fine hollow particle composed of a resin film comprising a melamine-based resin including a plurality of small piece-shaped portions and a bonding portion for bonding them. By forming such a structure, it is possible to easily obtain a stable fine hollow particle having good dispersibility and a large particle diameter.

DESCRIPTION OF EMBODIMENTS

The fine hollow particle of the present invention is a fine hollow particle composed of a resin film comprising a melamine-based resin, in which the resin film is composed of a plurality of small piece-shaped portions and a bonding portion for bonding the plurality of small piece-shaped portions. The resin film constitutes an outer shell (capsule outer shell) of the fine hollow particle.

The resin film is made of a melamine-based resin. The melamine-based resin is a resin produced by a condensation reaction of melamine and formaldehyde, and is produced, for example, by a condensation reaction of a melamine formaldehyde prepolymer compound produced from melamine and formaldehyde as described later.

Figure 1:
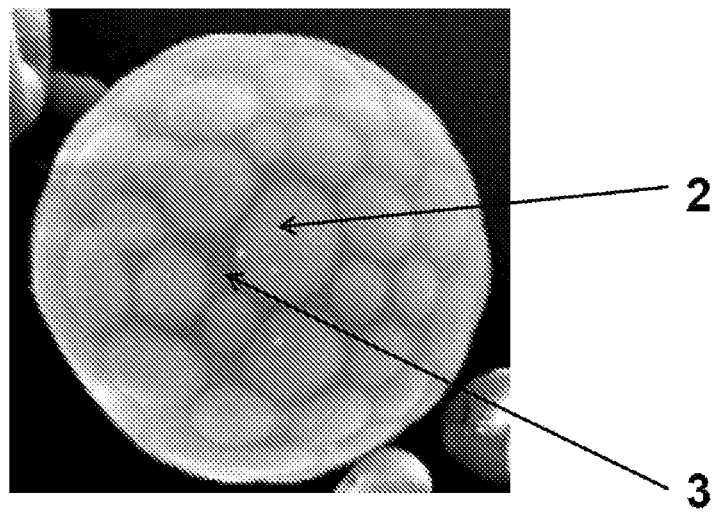
FIG. 1 is a field emission-type scanning electron microscope image showing the morphology of the fine hollow particle used in the present invention.
Figure 1:
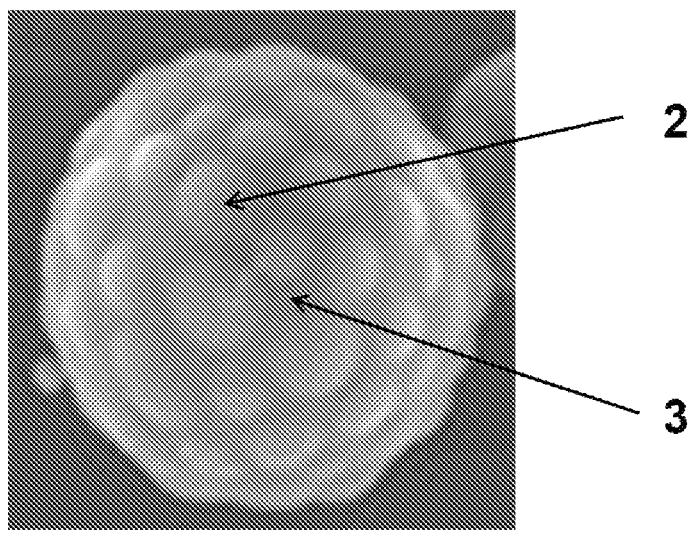

FIG. 1 shows the morphology of the fine hollow particle of the present invention observed by a field emission-type scanning electron microscope. FIG. 1 shows the case where the small piece-shaped portion has a substantially circular plate shape (1a) and the case where it has a substantially elliptical sphere shape (1b). Concretely, in the fine hollow particle shown by "1a" or "1b", the resin film is composed of a plurality of small piece-shaped portions "2" and a bonding portion "3" for bonding them. Further, as shown in FIG. 1, a plurality of small piece-shaped portions "2" are dispersedly present in the resin film of the fine spherical particles of the present invention, whereby irregularities are formed in the resin film.

Although it is not clear whether or not the resin film of the fine hollow particle of the present invention includes such a plurality of small piece-shaped portions and a bonding portion for bonding them, the present inventors consider as follows.

In general, a large emulsion having a particle size of more than several tens μm has low stability at the time of emulsion formation. Therefore, when fine particles having a particle size of several tens μm are formed, cohesive failure is likely to occur at the time of resin film formation, and the yield may be low. In the present invention, unlike the related art, it is presumed that two types of large and small emulsion particles are formed at the time of emulsion formation. At this time, it is presumed that when a shell composed of a resin film is formed at the interface of a large-sized emulsion particle having low stability, the shell is coalesced with a small-sized emulsion particle simultaneously produced in the system, whereby the mechanical stability as a film is improved while suppressing the cohesive failure of the large-sized emulsion particle, thereby forming a fine particle of several tens ρm.

In the present invention, the small piece-shaped portion is not particularly limited, but preferably has at least one shape selected from a substantially circular plate shape, a substantially elliptical sphere shape, and a substantially spherical shape. The longest diameter of the small piece-shaped portion is preferably 1 μm to 20 μm. Within this range, the resulting fine hollow body can have excellent strength. In the present invention, the term "longest diameter" refers to the longest diameter between the outer edges of the small piece-shaped portion.

In the present invention, the longest diameter of the small piece-shaped portion means the average longest diameter obtained from an image observed with a scanning electron microscope, and specifically, the longest diameter of at least 20 or more individual small piece-shaped portions is measured, and the average value thereof is calculated.

The particle diameter of the fine hollow particle of the present invention is preferably 10 to 100 μm. When the particle diameter is within this range, for example, in the case of blending in a CMP polishing pad, excellent polishing characteristics can be exhibited. Further, the particle diameter of the fine hollow particle is more preferably 20 to 50 μm.

In the present invention, the particle diameter of the fine hollow particle means an average particle diameter obtained from an image observed with a scanning electron microscope, and specifically, it is calculated as an average value of particle diameters of at least 20 or more individual fine hollow particles. The particle diameter of the individual fine hollow particles measured when the average particle diameter is obtained is the longest diameter of the fine hollow particle.

The bulk density of the fine hollow particle of the present invention is not particularly limited, but is preferably 0.01 to 0.5 g/cm$^3$. When the bulk density is within this range, the fine hollow particle can be suitably used for, for example, a heat insulating material or a CMP polishing pad.

The method for producing the fine hollow particle of the present invention is not particularly limited as long as the fine hollow particle having the characteristics of the present invention can be produced, but the fine hollow particle is preferably produced by the following method.

In the method for producing the fine hollow particle of the present invention, first, an oil-in-water (O/W) emulsion (hereinafter, also referred to as an O/W emulsion) is formed from an organic layer and a surfactant-containing aqueous layer, then a melamine formaldehyde prepolymer compound composed of melamine and formaldehyde is added as an additional phase to the O/W emulsion, the pH is adjusted to an acidic region, and the mixture is stirred and mixed under heating to cause a condensation reaction of methylolated melamine at the droplet interface of the dispersed oil phase to form a resin film, thereby producing fine particles encapsulating the oil phase. Thereafter, the fine particles encapsulating the oil phase are obtained by filtration, centrifugation, or the like, and then the oil phase or the water phase inside the fine particles is removed by vacuum drying to recover the fine hollow particles. Specific examples are shown below, but the production method in the present invention is not limited thereto.

The method for producing the fine hollow particles according to the present invention is further divided into the following steps: a first step: a step of preparing (a) an oil phase of an organic solvent (hereinafter, also referred to as a component (a)); a second step: a step of preparing (b) a water phase containing a surfactant (hereinafter, also referred to as a component (b)); a third step: a step of mixing and stirring the component (a) and the component (b) to prepare an O/W emulsion in which the water phase forms a continuous phase and the oil phase forms a dispersed phase; a fourth step: a step of adding a melamine formaldehyde prepolymer compound as an additional phase to the O/W emulsion and promoting a condensation reaction of methylolated melamine, which is a melamine formaldehyde prepolymer compound, on the interface of the O/W emulsion to form a resin film to form fine particles and obtain a fine particle dispersion liquid in which the fine particles are dispersed; a fifth step: a step of separating the fine particles from the fine particle dispersion liquid; and a sixth step: a step of removing the oil phase from the inside of the fine particles to obtain fine hollow particles.

First Step:

The first step is a step of preparing (a) an oil phase composed of an organic solvent, which serves as a dispersed phase in the O/W emulsion.

Second Step:

The second step is a step of preparing a water phase containing a surfactant (b) and water, which serves as a continuous phase in the O/W emulsion. In the second step, the pH may be adjusted as necessary.

This step includes a step of dissolving a surfactant described later in water and adjusting the pH as necessary. Adjustment of the pH and the like may be performed by a known method.

In the present invention, the surfactant is used in an amount of 0.1 to 10 parts by mass, and preferably 0.5 to 10 parts by mass, with respect to 100 parts by mass of the water phase. Within this range, aggregation of droplets of the dispersed phase in the O/W emulsion can be avoided, and fine hollow particles can be easily obtained in a high yield.

For example, when a maleic anhydride copolymer is used as the surfactant, the pH may preferably be adjusted to a pH at which a carboxylic acid is produced from maleic anhydride.

Third Step:

The third step is a step of mixing and stirring the component (a) obtained in the first step and the component (b) obtained in the second step to prepare an O/W emulsion in which the component (a) forms a dispersed phase and the component (b) forms a continuous phase.

In the present invention, the method of mixing and stirring the component (a) and the component (b) to form an O/W emulsion can be appropriately adjusted by mixing and stirring by a known method in consideration of the particle diameter of the fine hollow particles to be produced. Further, in the step of preparing the O/W emulsion, the temperature and pH can also be adjusted.

Among these, a method of mixing the component (a) and the component (b) and then dispersing the mixture by stirring using a known dispersing machine such as a high-speed shearing type, a friction type, a high-pressure jet type, or an ultrasonic type to form an O/W emulsion is suitably employed, and among these, a high-speed shearing type is preferred. When a high-speed shearing type dispersing machine is used, the rotational speed is preferably 500 to 20,000 rpm, and more preferably 1,000 to 10,000 rpm. The dispersion time is preferably 0.1 to 30 minutes, and preferably 1 to 10 minutes. The dispersion temperature is preferably 20 to 80° C.

In the present invention, the weight ratio of the component (a) to the component (b) is preferably 100 to 500 parts by mass, and more preferably 150 to 300 parts by mass, per 100 parts by mass of the component (a). The weight ratio of the component (a) to the component (b) is the weight ratio when the component (a) and the component (b) are mixed in the third step.

By adopting the above conditions, it becomes easy to obtain the fine hollow particle of the present invention composed of a resin film composed of a plurality of small piece-shaped portions and a bonding portion for bonding these small piece-shaped portions. It is presumed that this is because emulsion particles having a large size and emulsion particles having a small size are simultaneously formed in the system in the O/W emulsion.

Fourth Step:

The fourth step is a step of adding a melamine formaldehyde prepolymer compound as an additional phase to the O/W emulsion, causing a condensation reaction of methylolated melamine, which is the melamine formaldehyde prepolymer compound, at the droplet interface of the O/W emulsion to form a resin film, and forming fine particles encapsulating the oil phase, thereby obtaining a fine particle dispersion liquid in which the formed fine particles are dispersed.

In this step, it is presumed that a resin film is formed while the emulsion particles having a small size are coalesced at the interface of the emulsion particles having a large size.

As the additional phase, only the melamine formaldehyde prepolymer compound may be used, but it is preferable to use the melamine formaldehyde prepolymer compound dissolved in water or an alkaline aqueous solution.

The amount of the melamine formaldehyde prepolymer compound used in the additional phase is not particularly limited, but is preferably 20 to 100 parts by mass per 100 parts by mass of the component (a) used in the first step in order to favorably form fine particles.

As the melamine formaldehyde prepolymer compound, a commercially available melamine formaldehyde prepolymer compound described later may be added as it is, or may be dissolved in water or an alkaline aqueous solution and used, or a melamine formaldehyde prepolymer compound produced in an alkaline aqueous solution by an addition reaction of formaldehyde to melamine by heating in an alkaline region in an alkaline aqueous solution containing melamine and formaldehyde according to a conventional method may be used as it is.

When the total amount of the melamine formaldehyde prepolymer compound in the additional phase is 100 parts by mass, water or the alkaline aqueous solution is preferably used in a range of 0 to 500 parts by mass, and more preferably used in a range of 20 to 300 parts by mass.

The pH of the water phase which is a continuous phase may be adjusted after the addition of the additional phase. The pH of the aqueous phase which is a continuous phase is preferably less than 7, and the pH is more preferably adjusted to 3.5 to 6.5, and the pH is most preferably adjusted to 4.0 to 5.5. The reaction temperature is preferably in the range of 40 to 90° C. The reaction time is preferably in the range of 1 to 48 hours.

Fifth Step:

The fifth step is a step of separating the fine particles from the fine particle dispersion liquid. The method for separating the fine particles from the fine particle dispersion liquid is not particularly limited and may be selected from general separation methods, and specifically, filtration, centrifugation, or the like is used.

Sixth Step:

The sixth step is a step of removing the internal oil phase from the fine particles obtained in the fifth step to obtain fine hollow particles. The method of removing the oil phase from the fine particles is not particularly limited and may be selected from general separation methods, and specifically, a circulating air dryer, a spray dryer, a fluidized bed dryer, a vacuum dryer, or the like is used. The temperature condition for drying is preferably 40 to 250° C., and more preferably 50 to 200° C.

Each component used in the present invention will be described below.

In the present invention, the organic solvent used for the component (a) is not particularly limited, but an organic solvent having a boiling point of 90° C. to 200° C. is preferable. By using an organic solvent having a boiling point in this range, formation of an emulsion can be maintained even at a temperature at which a condensation reaction of methylolated melamine is performed, and the organic solvent is easily removed from the obtained fine particles. The organic solvent more preferably has a boiling point of 100° C. to 180° C. Examples thereof include the following.

As the hydrocarbon-based solvent, for example, aliphatic hydrocarbons having 7 to 11 carbon atoms and alicyclic hydrocarbons such as cycloheptane and cyclooctane are used. As the solvent other than the hydrocarbon-based solvent, for example, butyl acetate, dibutyl ether, 1,2-dichloroethane, toluene, xylene, benzaldehyde, chlorobenzene, dichlorobenzene, and the like are used.

These organic solvents may be used alone or as a mixed solvent of two or more kinds thereof.

The organic solvent used in the present invention is more preferably an aliphatic hydrocarbon having 8 to 11 carbon atoms, cycloheptane, cyclooctane, toluene, xylene, or chlorobenzene, and most preferably toluene, xylene, or chlorobenzene.

In the present invention, the surfactant used for the component (b) is not particularly limited, and two or more kinds of surfactants may be mixed. The surfactant of the present invention preferably has a carboxy group as at least one kind of hydrophilic group, and the carboxy group may be generated by hydrolysis of a dicarboxylic acid anhydride. Among these, a maleic anhydride copolymer such as a styrene-maleic anhydride copolymer, an ethylene-maleic anhydride copolymer, or an isobutylene-maleic anhydride copolymer can be suitably used. Among them, an ethylene-maleic anhydride copolymer can be suitably used. As the above-mentioned maleic anhydride copolymer, one having a molecular weight of about 30000 to 500000 is suitably used. Within this range, a stable emulsion and resin film can be formed.

The melamine formaldehyde prepolymer compound which can be used in the present invention is a methylolated melamine including melamine and formaldehyde, and can be produced according to a conventional method. For example, the melamine formaldehyde prepolymer compound can be produced by an addition reaction of formaldehyde to melamine by heating in an alkaline region in an alkaline aqueous solution containing melamine and formaldehyde. As the melamine formaldehyde prepolymer compound, a commercially available product can also be used as appropriate. For example, BECKAMINE APM, BECKAMINE M-3, BECKAMINE M-3 (60), BECKAMINE MA-S, BECKAMINE J-101, BECKAMINE J-1 01LF (manufactured by DIC Corporation), Nikaresin S-176, Nikaresin S-260 (manufactured by Nippon Carbide Industries Co., Inc.), Mirbane Resin SM-800 (manufactured by Showa Highpolymer Co., Ltd.) and the like can be mentioned.

The methylolated melamine described above can be prepared from monomethylolated melamine (molar ratio of melamine/formaldehyde: 1/1) to hexamethylolated melamine (molar ratio of melamine/formaldehyde: 1/6) depending on the molar ratio of melamine to formaldehyde, and trimethylolated melamine (molar ratio of melamine/formaldehyde: 1/3) to pentamethylolated melamine (molar ratio of melamine/formaldehyde: 1/5) are preferred, and tetramethylolated melamine (molar ratio of melamine/formaldehyde: 1/4) is particularly preferred, from the viewpoint of both the surrounding property with respect to droplets of the oil phase in the O/W emulsion and the condensation reactivity (crosslinking property).

The mechanism of the formation of the fine hollow particles is presumed to be that droplets of the (a) oil phase composed of the organic solvent are dispersed in the water phase, methylolated melamine forms an acid amide bond with the hydrophilic group (e.g., carboxy group) of the surfactant coordinated at the droplet interface, thereby surrounding the droplets with methylolated melamine, and adjacent methylolated melamines in this surrounding state undergo a dehydration condensation reaction between the methylol groups to form a capsule outer shell of melamine-formaldehyde resin. The methylolation ratio of melamine (molar ratio of formaldehyde to melamine) is related to the density of the capsule outer shell, and the higher the methylolation ratio, the higher the crosslinking density and the denser the capsule outer shell. Therefore, the methylolated melamine is preferably formed in the above-described range.

The fine hollow particles of the present invention can be applied to various applications, for example, in many fields, such as agricultural chemicals, pharmaceuticals, cosmetic materials, liquid crystals, adhesives, electronic material parts, and building materials. In particular, the fine hollow particles of the present invention can be suitably used for applications such as shoe soles and insoles, heat insulating materials, soundproof materials, and CMP polishing pads.

As a method used for such a CMP polishing pad application, a known method can be adopted without limitation, and for example, a resin containing the fine hollow particles of the present invention as a foaming agent can be cut and subjected to surface polishing to obtain a CMP polishing pad having pores on the polishing surface of the resin.

The resin is not particularly limited, but in the present invention, a polyurethane resin to be described later is particularly preferable. That is, it is preferable to prepare a cured body in which the fine hollow particles of the present invention are dispersed in a polyurethane resin, and to produce a CMP polishing pad from the cured body.

In particular, since the fine hollow particles of the present invention have good compatibility with a polyurethane resin, when the fine hollow particles are used in a CMP polishing pad, the fine hollow particles are less likely to fall off, and the scratch resistance can be improved.

The CMP polishing pad of the present invention has a density of preferably 0.40 to 1.10 $g/cm^3$, and more preferably 0.50 to 1.05 $g/cm^3$. Further, a cured body obtained by foaming the fine hollow particles of the present invention in combination with a known foaming method can also be used as a CMP polishing pad. As the known foaming method, for example, in a foaming agent foaming method in which water is added, in the case of a polyurethane resin, water reacts with an iso(thio)cyanate group, and then carbon dioxide and an amino group are generated. The carbon dioxide becomes a foaming gas, and the amino group further reacts with an iso(thio)cyanate group to form a urea bond and/or a thiourea bond.

The CMP polishing pad of the present invention can have any suitable hardness. The hardness in the present invention can be measured according to the Shore method, for example, according to the JIS standard (hardness test) K 6253. In the present invention, the Shore hardness of the CMP polishing pad is preferably 30 A to 80 D, and more preferably 40 A to 70 D ("A" indicates the hardness on the Shore "A" scale, and "D" indicates the hardness on the Shore "D" scale). That is, for example, 30 A to 80 D means that the Shore A hardness is 30 or more, and the Shore D hardness is 70 or less.

The hardness can be arbitrarily set by changing the blending composition and the blending amount as necessary.

Further, the CMP polishing pad of the present invention preferably has a compression ratio in the following range from the viewpoint of exhibiting the flatness of the object to be polished. The compression ratio can be measured by a method in accordance with JIS L 1096. The compression ratio is preferably 0.5% to 50%. When it is within the above range, excellent flatness of the object to be polished can be exhibited.

The abrasion resistance of the CMP polishing pad of the present invention is preferably 60 mg or less, and more preferably 50 mg or less, in the Taber abrasion test. When the Taber abrasion amount is reduced, excellent abrasion resistance can be exhibited when used as a CMP polishing pad.

The embodiment of the CMP polishing pad of the present invention is not particularly limited, and for example, a groove structure may be formed on the surface thereof. The groove structure of the CMP polishing pad is preferably a shape for holding and renewing slurry, and specific examples thereof include an X (stripe) groove, an XY lattice groove, a concentric groove, a through hole, a non-through hole, a polygonal column, a cylinder, a spiral groove, an eccentric circular groove, a radial groove, and a combination of these grooves.

The method for producing the groove structure of the CMP polishing pad is not particularly limited. Examples of the method include a method in which the above-mentioned compound or the like is poured into a mold having a predetermined groove structure and cured, or a method in which the obtained resin is used to form a groove structure, for example, a method in which mechanical cutting is performed using a jig such as a bite having a predetermined size, a production method in which a resin is pressed with a press plate having a predetermined surface shape, a production method using photolithography, a production method using a printing technique, and a production method using a laser beam such as a carbon dioxide laser.

The CMP polishing pad of the present invention may be composed of a plurality of layers. In this case, the cured body of the present invention may be used in at least any of the layers. For example, when the CMP polishing pad is composed of two layers, the CMP polishing pad has a two layer structure of a polishing layer (also referred to as a first layer) having a polishing surface that comes into contact with an object to be polished during polishing, and an under layer (also referred to as a second layer) that is in contact with the first layer on a surface facing the polishing surface of the first layer. In this case, the characteristics of the CMP polishing pad can be adjusted by making the second layer and the first layer different in hardness and elastic modulus. In this case, the under layer is preferably smaller in hardness than the polishing layer. In the present invention, the cured body of the present invention is suitably used as a polishing layer, and the cured body of the present invention may also be used in the under layer.

Hereinafter, the polyurethane resin used in the above-described CMP polishing pad will be described in detail.

The polyurethane resin may be produced by a known method without particular limitation, and examples thereof include a method of uniformly mixing and dispersing (B) a polyfunctional isocyanate compound (hereinafter, also referred to as a component (B)), (C) a compound having two or more active hydrogen groups curable with an isocyanate group (hereinafter, also referred to as a component (C)), and if necessary, other blending components, and then curing the mixture. Examples of the active hydrogen group of the component (C) include a group selected from the group consisting of a hydroxy group, a thiol group, and an amino group.

The cured body obtained by dispersing the fine hollow particles of the present invention in a polyurethane resin can be produced, for example, by curing a curable composition containing the component (B), the component (C), and the fine hollow particles of the present invention. If necessary, other blending components may be added to the curable composition. The cured body thus produced can be used as a CMP polishing pad, for example, by processing into a desired shape.

The curing method is not particularly limited, and a known method may be employed. For example, the conditions described in WO 2015/068798, WO 2016/143910, and WO 2018/092826 can be employed. Specifically, a dry method such as a one pot method or a prepolymer method, a wet method using a solvent, or the like can be used. Among them, the dry method is preferably employed.

The blending amount of the fine hollow particles of the present invention in the polyurethane resin is preferably 0.1 to 20 parts by mass, more preferably 0.2 to 10 parts by mass, and still more preferably 0.5 to 8 parts by mass, per 100 parts by mass of the total of the component (B) and the component (C). Within this range, excellent polishing characteristics can be exhibited.

In the present invention, the polyurethane resin is a general term for a polyurethane resin, a polyurea resin, and a polyurethane-urea resin. Further, the polyurethane resin of the present invention includes a polythiourethane resin and a polythiourethane resin.

Hereinafter, each component will be individually described in detail.

<(B) Polyfunctional Isocyanate Compound; Component (B)>

The component (B) is a compound having at least two iso(thio)cyanate groups.

In the present invention, the iso(thio)cyanate group refers to an isocyanate group (NCO group) or an isothiocyanate group (NCS group). As the component (B), of course, a compound having both an isocyanate group and an isothiocyanate group is also selected. Therefore, the number of iso(thio)cyanate groups in the component (B) means the total number of isocyanate groups and isothiocyanate groups.

Among them, a compound having 2 to 6 iso(thio)cyanate groups in the molecule is preferable, a compound having 2 to 4 iso(thio)cyanate groups is more preferable, and a compound having 2 to 3 iso(thio)cyanate groups is still more preferable.

Further, the component (B) may be (B1) urethane prepolymer (hereinafter also referred to as a "component (B1)") produced by a reaction between (B11) a bifunctional iso(thio)cyanate compound having two iso(thio)cyanate groups in the molecule (hereinafter also referred to as a "component (B11)") described later and (C11) a bifunctional active hydrogen-containing compound having two active hydrogen groups in the molecule (hereinafter also referred to as a "component (C11)"). The component (B1) corresponding to the component (B) can be used without any limitation as long as it contains two or more unreacted isocyanate groups or isothiocyanate groups, and the component (B1) containing two or more isocyanate groups is preferable.

The active hydrogen group in the component (C11) is a group selected from a hydroxy group, a thiol group, and an amino group.

The component (B) can be broadly classified into an aliphatic isocyanate, an alicyclic isocyanate, an aromatic isocyanate, an isothiocyanate, other isocyanates, and the component (B1). As the component (B), one type of compound may be used, or a plurality of types of compounds may be used. When a plurality of types of compounds are used, the reference mass is the total amount of the plurality of types of compounds. Specific examples of the component (B) include the following.

[Aliphatic Isocyanate; Component (B)]

Bifunctional isocyanates such as ethylene diisocyanate, trimethylene diisocyanate, tetramethylene diisocyanate, hexamethylene diisocyanate, octamethylene diisocyanate, nonamethylene diisocyanate, 2,2'-dimethylpentane diisocyanate, 2,2,4-trimethylhexamethylene diisocyanate, decamethylene diisocyanate, butenediisocyanate, 1,3-butadiene-1,4-diisocyanate, 2,4,4-trimethylhexamethylene diisocyanate, 1,6,11-trimethylundecamethylene diisocyanate, 1,3,6-trimethylhexamethylene diisocyanate, 1,8-diisocyanate-4-isocyanatomethyloctane, 2,5,7-trimethyl-1,8-diisocyanate-5-isocyanatomethyloctane, bis(isocyanatoethyl) carbonate, bis(isocyanatoethyl) ether, 1,4-butylene glycol dipropyl ether ω,ω'diisocyanate, lysine diisocyanate methyl ester, and 2,4,4-trimethylhexamethylene diisocyanate (corresponding to the component (B11) constituting the component (B1) described in detail below).

[Alicyclic Isocyanate; Component (B)]

Bifunctional isocyanates such as isophorone diisocyanate, (bicyclo[2.2.1]heptane-2,5-diyl)bismethylene diisocyanate, (bicyclo[2.2.1]heptane-2,6-diyl)bismethylene diisocyanate, 2β,5α-bis(isocyanato)norbornane, 2β,5β-bis(isocyanato) norbornane, 2β,6α-bis(isocyanato)norbornane, 2β,6β-bis(isocyanato)norbornane, 2,6-di(isocyanatomethyl)furan, bis(isocyanatomethyl)cyclohexane, dicyclohexylmethane-4,4'-diisocyanate, 4,4-isopropylidenebis(cyclohexylisocyanate), cyclohexane diisocyanate, methylcyclohexane diisocyanate, dicyclohexyldimethylmethane diisocyanate, 2,2'-dimethyldicyclohexylmethane diisocyanate, bis(4-isocyanate-n-butylidene)pentaerythritol, dimer acid diisocyanate, 2,5-bis(isocyanatomethyl)-bicyclo[2,2,1]-heptane, 2,6-bis(isocyanatomethyl)-bicyclo[2,2,1]-heptane, 3,8-bis(isocyanatemethyl)tricyclodecane, 3,9-bis(isocyanatemethyl)tricyclodecane, 4,8-bis(isocyanatemethyl)tricyclodecane, 4,9-bis(isocyanatemethyl)tricyclodecane, 1,5-diisocyanatodecalin, 2,7-diisocyanatodecalin, 1,4-diisocyanatodecalin, 2,6-diisocyanatodecalin, bicyclo[4.3.0]nonane-3,7-diisocyanate, bicyclo[4.3.0]nonane-4,8-diisocyanate, bicyclo[2.2.1]heptane-2,5-diisocyanate, bicyclo[2.2.1]heptane-2,6-diisocyanate, bicyclo[2,2,2]octane-2,5-diisocyanate, bicyclo[2,2,2]octane-2,6-diisocyanate, tricyclo[5.2.1.02.6]decane-3,8-diisocyanate, and tricyclo[5.2.1.02.6]decane-4,9-diisocyanate (corresponding to the component (B11) constituting the component (B1) described in detail below).

Polyfunctional isocyanates such as 2-isocyanatomethyl-3-(3-isocyanatopropyl)-5-isocyanatomethyl-bicyclo[2,2,1]-heptane, 2-isocyanatomethyl-3-(3-isocyanatopropyl)-6-isocyanatomethyl-bicyclo[2,2,1]-heptane, 2-isocyanatomethyl-2-(3-isocyanatopropyl)-5-isocyanatomethyl-bicyclo[2,2,1]-heptane, 2-isocyanatomethyl-2-(3-isocyanatopropyl)-6-isocyanatomethyl-bicyclo[2,2,1]-heptane, 2-isocyanatomethyl-3-(3-isocyanatopropyl)-5-(2-isocyanatoethyl)-bicyclo[2,2,1]-heptane, 2-isocyanatomethyl-3-(3-isocyanatopropyl)-6-(2-isocyanatoethyl)-bicyclo[2,1,1]-heptane, 2-isocyanatomethyl-2-(3-isocyanatopropyl)-5-(2-isocyanatoethyl)-bicyclo[2,2,1]-heptane, 2-isocyanatomethyl-2-(3-isocyanatopropyl)-6-(2-isocyanatoethyl)-bicyclo[2,2,1]-heptane, and 1,3,5-tris(isocyanatomethyl)cyclohexane.

[Aromatic Isocyanate; Component (B)]

Bifunctional isocyanates such as xylylene diisocyanate (o-, m-, p-), tetrachloro-m-xylylene diisocyanate, methylenediphenyl-4,4'-diisocyanate, 4-chloro-m-xylylene diisocyanate, 4,5-dichloro-m-xylylene diisocyanate, 2,3,5,6-tetrabromo-p-xylylene diisocyanate, 4-methyl-m-xylylene diisocyanate, 4-ethyl-m-xylylene diisocyanate, bis(isocyanatoethyl)benzene, bis(isocyanatopropyl)benzene, 1,3-bis(α,α-dimethylisocyanatomethyl)benzene, 1,4-bis(α,α-dimethylisocyanatomethyl)benzene, α,α,α',α'-tetramethylxylylene diisocyanate, bis(isocyanatobutyl) benzene, bis(isocyanatomethyl)naphthalene, bis(isocyanatomethyl)diphenyl ether, bis(isocyanatoethyl) phthalate, 2,6-di(isocyanatomethyl)furan, phenylene diisocyanate (o-, m-, p-), tolylene diisocyanate, ethylphenylene diisocyanate, isopropylphenylene diisocyanate, dimethylphenylene diisocyanate, diethylphenylene diisocyanate, diisopropylphenylene diisocyanate, trimethylbenzene triisocyanate, benzene triisocyanate, 1,3,5-triisocyanate methylbenzene, 1,5-naphthalene diisocyanate, methylnaphthalene diisocyanate, biphenyl diisocyanate, 2,4-tolylene diisocyanate, 2,6-tolylene diisocyanate, 4,4'-diphenylmethane diisocyanate, 2,2'-diphenylmethane diisocyanate, 2,4'-diphenylmethane diisocyanate, 3,3'-dimethyldiphenylmethane-4,4'-diisocyanate, bibenzyl-4,4'-diisocyanate, bis(isocyanatophenyl)ethylene, 3,3'-dimethoxybiphenyl-4,4' diisocyanate, phenyl isocyanatomethyl isocyanate, phenyl isocyanatoethyl isocyanate, tetrahydronaphthylene diisocyanate, hexahydrobenzene diisocyanate, hexahydrodiphenylmethane-4,4'-diisocyanate, diphenyletherdiisocyanate, ethyleneglycoldiphenyletherdiisocyanate, 1,3-propyleneglycoldiphenyletherdiisocyanate, benzophenonediisocyanate, diethyleneglycoldiphenyletherdiisocyanate, dibenzofurandiisocyanate, carbazolediisocyanate, ethylcarbazolediisocyanate, dichlorocarbazolediisocyanate, 2,4-tolylenediisocyanate, and 2,6-tolylenediisocyanate (corresponding to the component (B11) constituting the component (B1) described in detail below).

Polyfunctional isocyanate compounds such as methylene triisocyanate, triphenylmethane triisocyanate, polymeric MDI, naphthalene triisocyanate, diphenylmethane-2,4,4'-triisocyanate, 3-methyldiphenylmethane-4,4',6-triisocyanate, and 4-methyldiphenylmethane 2,3,4',5,6-pentaisocyanate.

[Isothiocyanate; Component (B)]

Bifunctional isothiocyanates such as p-phenylenediisothiocyanate, xylylene-1,4-diisothiocyanate, and ethylidine diisothiocyanate (corresponding to the component (B11) constituting the component (B1) described in detail below).

[Other Isocyanates: Component (B)]

Examples of other isocyanates include polyfunctional isocyanates having a biuret structure, a uretdione structure, or an isocyanurate structure (for example, JP 2004-534870 A discloses a method for modifying a biuret structure, a uretdione structure, or an isocyanurate structure of an aliphatic polyisocyanate) using diisocyanates such as hexamethylene diisocyanate or tolylene diisocyanate as a main raw material, and polyfunctional compounds as adducts with polyols having three or more functional groups such as trimethylolpropane (disclosed in a book (Polyurethane Resin Handbook, edited by Keiji Iwata, Nikkan Kogyo Shimbun, Ltd. (1987)).

[(B1) Urethane Prepolymer; Component (B) Having an Iso(Thio)Cyanate Group at Both Terminals; Component (B1)]

In the present invention, the component (B1) produced by the reaction between the component (B11) and a component (C11) described later can also be used as the component (B). The component (B1) is a compound having an iso(thio)cyanate group at both terminals.

The component (B1) is not particularly limited, but it is particularly preferable to use the following exemplified monomers as the component (B11). Specifically, it is preferable to use 1,5-naphthalene diisocyanate, xylene diisocyanate (o-, m-, p-), 2,4-tolylene diisocyanate, 2,6-tolylene diisocyanate, phenylene diisocyanate (o-, m-, p-), 2,2'-diphenylmethane diisocyanate, 2,4'-diphenylmethane diisocyanate, 4,4'-diphenylmethane diisocyanate, isophorone diisocyanate, 1,3-bis(isocyanatomethyl)cyclohexane, dicyclohexylmethane-4,4'-diisocyanate, or (bicyclo[2.2.1]heptane-2,5(2,6)-diyl)bismethylene diisocyanate. These are preferably reacted with the component (C11) to obtain the component (B1) having an isocyanate group and/or an isothiocyanate group at both terminals.

In addition, in order for the polyurethane resin finally obtained to exhibit particularly excellent properties, it is preferable to produce the component (B1) using at least one kind of the component (C11) having a molecular weight (number average molecular weight) of 300 to 2000. The active hydrogen group refers to a hydroxy group, a thiol group, or an amino group. Among these, in consideration of reactivity, the active hydrogen group in the component (C11) is preferably a hydroxy group.

The component (C11) having a molecular weight (number average molecular weight) of 300 to 2000 may be used in combination of different types or different molecular weights. In addition, in order to adjust the hardness, strength, and the like of the polyurethane resin finally obtained, it is preferable to use, as the component (B1), those produced by combining the component (C11) having a molecular weight (number average molecular weight) of 300 to 2000 and the component (C11) having a molecular weight (number average molecular weight) of 90 to 300. In this case, although it depends on the types of the component (C11) and the component (B11) to be used and the amount of the components to be used, when the component (C11) having a molecular weight of 300 to 2000 is 100 parts by mass, the component (C11) having a molecular weight of 90 to 300 is preferably 0 to 50 parts by mass, and the component (C11) having a molecular weight of 90 to 300 is more preferably 1 to 40 parts by mass.

Further, in the component (B1), both terminals of the molecule must be an iso(thio)cyanate group. Therefore, it is preferable that the component (B1) is produced in a range in which the total number of moles (n5) of iso(thio)cyanate groups in the component (B11) and the total number of moles (n6) of active hydrogen groups (a hydroxy group, a thiol group, or an amino group) in the component (C11) satisfy $1<(n5)/(n6)\leq 2.3$. When the component (B11) having two or more kinds of molecular terminals is used, the number of moles (n5) of iso(thio)cyanate groups is, of course, the total number of moles of iso(thio)cyanate groups of the component (B11). Further, the number of moles (n6) of active hydrogen group of the two or more kinds of the component (C11) is, of course, the number of moles of active hydrogens in the total of active hydrogeng groups. Even when the active hydrogen group is a primary amino group, the primary amino group is considered to be 1 mol. That is, in the primary amino group, considerable energy is required for the second amino group (—NH) to react (even in the case of the primary amino group, the second-NH is difficult to react). Therefore, in the present invention, even if a component (C11) having a primary amino group is used, the primary amino group can be calculated as 1 mol.

The iso(thio)cyanate equivalent (the total amount of isocyanate equivalent and/or isothiocyanate equivalent) of the component (B1) can be determined by quantifying the iso(thio)cyanate group of the component (B1) in accordance with JIS K 7301. The iso(thio)cyanate group can be quantified by the following back titration method. First, the obtained component (B1) is dissolved in a dried solvent. Next, di-n-butylamine having a known concentration is added to the dried solvent in an amount that is clearly in excess of the amount of the iso(thio)cyanate groups of the component (B1), and all of the iso(thio)cyanate groups of the component (B1) are reacted with the di-n-butylamine. The amount of di-n-butylamine consumed is then determined by titration with acid of the di-n-butylamine not consumed (not participating in the reaction). Since the consumed di-n-butylamine and the iso(thio)cyanate group contained in the component (B1) are in the same amount, the iso(thio)cyanate equivalent can be determined. In addition, since the component (B1) is a linear urethane prepolymer having an iso(thio)cyanate group at both terminals, the number average molecular weight of the component (B1) is twice as large as the iso(thio)cyanate equivalent. The molecular weight of the component (B1) tends to match the value measured by gel permeation chromatography (GPC). For example, when the component (B1) and the component (B11) are used in combination, a mixture of both may be measured according to the above-mentioned method.

The component (B1) is not particularly limited, but preferably has an iso(thio)cyanate equivalent of 300 to 5000, more preferably 350 to 3000, and particularly preferably 350 to 2000. The reason for this is not particularly clear, but is considered as follows. It is considered that by using the component (B1), crosslinking points in the polyurethane resin are easily dispersed and are present randomly and uniformly, and stable performances are exhibited. Further, the polyurethane resin obtained by using the component (B1) becomes easy to control during production. For example, it is considered that when the curable composition used in the present invention is used as a polishing pad, it can be suitably used. It is also considered that such an effect is exhibited even when the average iso(thio)cyanate equivalent of the polyiso(thio)cyanate compound is 300 to 5000 in the case where the component (B1) and the component (B11) are used in combination. However, it is considered that the effect is more remarkable in the case of using only the component (B1).

The method for producing the component (B1) used in the present invention may be carried out by reacting the component (C11) having two active hydrogen groups (a hydroxy group, a thiol group, or an amino group) in the molecule with the component (B11) to produce the component (B1) having an isocyanate group or an isothiocyanate group at the terminal of the molecule. There is no limitation as long as a prepolymer having an isocyanate group or an isothiocyanate group at the terminal can be obtained.

As described above, the preferable blending amount of the component (C11) and the component (B11) for obtaining the component (B1) is as follows. Specifically, it is preferable to produce the component (B1) in a range in which the number of moles (n5) of iso(thio)cyanate groups in the component (B11) and the number of moles (n6) of active hydrogen in the component (C11) satisfy $1<(n5)/(n6)\leq 2.3$.

In addition, in order to produce the component (B1), in the reaction, the component (B1) can be produced by heating or adding a urethanization catalyst as necessary.

From the viewpoint of controlling the strength and reactivity of the polyurethane resin to be formed, the most preferable examples of the component (B) used in the present invention include alicyclic isocyanates such as isophorone diisocyanate, 1,3-bis(isocyanatemethyl)cyclohexane, and (bicyclo[2.2.1]heptane-2,5(2,6)-diyl)bismethylene diisocyanate; aromatic isocyanates such as 2,4-tolylene diisocyanate, 2,6-tolylene diisocyanate, 4,4'-diphenylmethane diisocyanate, and xylylene diisocyanate (o-, m-, p-); polyfunctional isocyanates having a biuret structure, a uretdione structure, or an isocyanurate structure using diisocyanates such as hexamethylene diisocyanate or tolylene diisocyanate as a main raw material; polyfunctional isocyanates as adducts with polyols having three or more functional groups; and the component (B1).

Among them, the component (B1) is particularly preferable.

<(C) Compound Having Two or More Active Hydrogen Groups Curable with Isocyanate Group; Component (C)>

The component (C) can be used without limitation as long as it is a compound having at least two or more groups selected from the group consisting of a hydroxy group, a thiol group, and an amino group in one molecule. Of course, a compound having any two or all of a hydroxy group, a thiol group, and an amino group may also be selected.

Above all, the component (C) preferably contains (CA) a compound having two or more amino groups (hereinafter, also referred to as a "component (CA)"), and more preferably further contains (CB) a compound having three or more hydroxy groups and/or thiol groups (hereinafter, also referred to as "component (CB)"). In the present invention, the compound having n or more hydroxy groups and/or thiol groups means that the total number of hydroxy groups and thiol groups in the compound is n or more, and the compound may be a compound having a hydroxy group and no thiol group, a compound having a thiol group and no hydroxy group, or a compound having both a hydroxy group and a thiol group.

Among these, the component (CB) is particularly preferably a compound having five or more hydroxy groups and/or thiol groups. In addition, the number of moles of the hydroxy group and/or the thiol group per mass of the component (CB) is preferably 0.5 mmol/g to 35 mmol/g, and more preferably 0.8 mmol/g to 20 mmol/g.

<(CA) Compound Having Two or More Amino Groups; Component (CA)>

The component (CA) can be used without limitation as long as it is a compound having two or more primary and/or secondary amino groups in one molecule. The compounds having two or more amino groups are broadly classified into aliphatic amines, alicyclic amines, aromatic amines, and polyrotaxanes having an amino group capable of polymerizing with an isocyanate group.

[Aliphatic Amine; Component (CA)]

Bifunctional amines (corresponding to the component (C11) constituting the component (B1)) such as ethylenediamine, hexamethylenediamine, nonamethylenediamine, undecanemethylenediamine, dodecamethylenediamine, metaxylenediamine, 1,3-propanediamine, and putrescine.

Polyfunctional amines such as polyamines such as diethylenetriamine.

[Alicyclic Amine; Component (CA)]

Bifunctional amines (corresponding to the component (C11) constituting the component (B1)) such as isophoronediamine and cyclohexyldiamine.

[Aromatic Amine; Component (CA)]

Bifunctional amines (corresponding to the component (C11) constituting the component (B1)) such as 4,4'-methylenebis(o-chloroaniline) (MOCA), 2,6-dichloro-p-phenylenediamine, 4,4'-methylenebis(2,3-dichloroaniline), 4,4'-methylenebis(2-ethyl-6-methylaniline), 3,5-bis(methylthio)-2,4-toluenediamine, 3,5-bis(methylthio)-2,6-toluenediamine, 3,5-diethyltoluene-2,4-diamine, 3,5-diethyltoluene-2,6-diamine, trimethyleneglycol-di-p-aminobenzoate, polytetramethyleneglycol-di-p-aminobenzoate, 4,4'-diamino-3,3',5,5'-tetraethyldiphenylmethane, 4,4'-diamino-3,3'-diisopropyl-5,5'-dimethyldiphenylmethane, 4,4'-diamino-3,3',5,5'-tetraisopropyldiphenylmethane, 1,2-bis(2-aminophenylthio)ethane, 4,4'-diamino-3,3'-diethyl-5,5'-dimethyldiphenylmethane, N,N'-di-sec-butyl-4,4'-diaminodiphenylmethane, 3,3'-diethyl-4,4'-diaminodiphenylmethane, m-xylylenediamine, N, N'-di-sec-butyl-p-phenylenediamine, m-phenylenediamine, p-xylylenediamine, p-phenylenediamine, 3,3'-methylenebis(methyl-6-aminobenzoate), 2-methylpropyl 2,4-diamino-4-chlorobenzoate, isopropyl 2,4-diamino-4-chlorobenzoate, isopropyl 2,4-diamino-4-chlorophenylacetate, di-(2-aminophenyl)thioethyl terephthalate, diphenylmethanediamine, tolylenediamine, and piperadine.

Polyfunctional amines such as 1,3,5-benzenetriamine and melamine.

[Polyrotaxane Having an Amino Group; Component (CA)]

The polyrotaxane having an amino group used in the present invention is not particularly limited, and examples thereof include polyrotaxanes described in WO 2018/092826.

Preferred examples of the component (CA) used in the present invention include 4,4'-methylenebis(o-chloroaniline) (MOCA), 4,4'-diamino-3,3'-diethyl-5,5'-dimethyldiphenylmethane, 3,5-diethyltoluene-2,4-diamine, 3,5-diethyltoluene-2,6-diamine, 3,5-bis(methylthio)-2,4-toluenediamine, 3,5-bis(methylthio)-2,6-toluenediamine, and trimethyleneglycol-di-p-aminobenzoate.

The compound having a hydroxy group and/or a thiol group in the component (C) is roughly classified into aliphatic alcohols, alicyclic alcohols, aromatic alcohols, polyester polyols, polyether polyols, polycaprolactone polyols, polycarbonate polyols, polyacryl polyols, castor oil-based polyols, compounds having two or more thiol groups, OH/SH-type polymerizable group-containing monomers, side chain-containing cyclic molecules having three or more hydroxy groups and/or thiol groups, and polyrotaxanes having a hydroxy group and/or a thiol group. Specific examples thereof include the following compounds.

((C) Compound Having Two or More Hydroxy Groups; Component (C))

[Aliphatic Alcohol; Component (C)]

Bifunctional polyols (corresponding to the component (C11) constituting the component (B1)) such as ethylene glycol, diethylene glycol, propylene glycol, dipropylene glycol, butylene glycol, 1,5-dihydroxypentane, 1,6-dihydroxyhexane, 1,7-dihydroxyheptane, 1,8-dihydroxyoctane, 1,9-dihydroxynonane, 1,10-dihydroxydecane, 1,11-dihydroxyundecane, 1,12-dihydroxydodecane, neopentyl glycol, glyceryl monooleate, monoelaidine, polyethylene glycol, 3-methyl-1,5-dihydroxypentane, dihydroxyneopentyl, 2-ethyl-1,2-dihydroxyhexane, and 2-methyl-1,3-dihydroxypropane.

Polyfunctional polyols (corresponding to the component (CB)) such as glycerin, trimethylolethane, trimethylolpropane, ditrimethylolpropane, trimethylolpropane tripolyoxyethylene ether (for example, TMP-30, TMP-60, TMP-90 and the like manufactured by Nippon Nyukazai Co., Ltd.), butanetriol, 1,2-methylglucoside, pentaerythritol, dipentaerythritol, tripentaerythritol, sorbitol, erythritol, threitol, ribitol, arabinitol, xylitol, allitol, mannitol, dolcitol, iditol, glycol, inositol, hexanetriol, triglycerol, diglycerol, and triethylene glycol.

[Alicyclic Alcohol; Component (C)]

Bifunctional polyols (corresponding to the component (C11) constituting the component (B1)) such as hydrogenated bisphenol-A, cyclobutanediol, cyclopentanediol, cyclohexanediol, cycloheptanediol, cyclooctanediol, cyclohexanedimethanol, hydroxypropylcyclohexanol, tricyclo[5,2,1,0$^{2,6}$]decane-dimethanol, bicyclo[4,3,0]-nonanediol, dicyclohexanediol, tricyclo[5,3,1,1$^{3,9}$]dodecanediol, bicyclo[4,3,0]nonanedimethanol, tricyclo[5,3,1,1$^{3,9}$]dodecane-diethanol, hydroxypropyltricyclo[5,3,1,1$^{3,9}$]dodecanol, spiro[3,4]octanediol, butylcyclohexanediol, 1,1'-bicyclohexylidenediol, 1,4-cyclohexanedimethanol, 1,3-cyclohexanedimethanol, 1,2-cyclohexanedimethanol, and o-dihydroxyxylylene.

Polyfunctional polyols (corresponding to the component (CB)) such as tris(2-hydroxyethyl)isocyanurate, cyclohexanetriol, sucrose, maltitol, and lactitol.

[Aromatic Alcohol; Component (C)]

Bifunctional polyols (corresponding to the component (C11) constituting the component (B1)) such as dihydroxynaphthalene, dihydroxybenzene, bisphenol 1, bisphenol F xylylene glycol, tetrabromobisphenol A, bis(4-hydroxyphenyl)methane, 1,1-bis(4-hydroxyphenyl)ethane, 1,2-bis(4-hydroxyphenyl)ethane, bis(4-hydroxyphenyl)phenylmethane, bis(4-hydroxyphenyl)diphenylmethane, bis(4-hydroxyphenyl)-1-naphthylmethane, 1,1-bis(4-hydroxyphenyl)-1-phenylethane, 2-(4-hydroxyphenyl)-2-(3-hydroxyphenyl)propane, 2,2-bis(4-hydroxyphenyl)butane, 1,1-bis(4-hydroxyphenyl)butane, 2,2-bis(4-hydroxyphenyl)-3-methylbutane, 2,2-bis(4-hydroxyphenyl)pentane, 3,3-bis(4-hydroxyphenyl)pentane, 2,2-bis(4-hydroxyphenyl)hexane, 2,2-bis(4-hydroxyphenyl)octane, 2,2-bis(4-hydroxyphenyl)-4-methylpentane, 2,2-bis(4-hydroxyphenyl)heptane, 4,4-bis(4-hydroxyphenyl)heptane, 2,2-bis(4-hydroxyphenyl)tridecane, 2,2-bis(4-hydroxyphenyl)octane, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-tert-butyl-4-hydroxyphenyl)propane, 2,2-bis(3-cyclohexyl-4-hydroxyphenyl)propane, 2,2-bis(3-allyl-4'-hydroxyphenyl)propane, 2,2-bis(3-methoxy-4-hydroxyphenyl)propane, 2,2-bis(3,5-dimethyl-4-hydroxyphenyl)propane, 2,2-bis(2,3,5,6-tetramethyl-4-hydroxyphenyl)propane, bis(4-hydroxyphenyl)cyanomethane, 1-cyano-3,3-bis(4-hydroxyphenyl)butane, 2,2-bis(4-hydroxyphenyl)hexafluoropropane, 1,1-bis(4-hydroxyphenyl)cyclopentane, 1,1-bis(4-hydroxyphenyl)cyclohexane, 1,1-bis(4-hydroxyphenyl)cycloheptane, 1,1-bis(3-methyl-4-hydroxyphenyl)cyclohexane, 1,1-bis(3,5-dimethyl-4-hydroxyphenyl)cyclohexane, 1,1-bis(3,5-dichloro-4-hydroxyphenyl)cyclohexane, 1,1-bis(3-methyl-4-hydroxyphenyl)-4-methylcyclohexane, 1,1-bis(4-hydroxyphenyl)-3,3,5-trimethylcyclohexane, 2,2-bis(4-hydroxyphenyl)norbornane, 2,2-bis(4-hydroxyphenyl)adamantane, 4,4'-dihydroxydiphenyl ether, 4,4'-dihydroxy-3,3'-dimethyldiphenyl ether, ethylene glycol bis(4-hydroxyphenyl)ether, 4,4'-dihydroxydiphenyl sulfide, 3,3'-dimethyl-4,4'-dihydroxydiphenyl sulfide, 3,3'-dicyclohexyl-4,4'-dihydroxydiphenyl sulfide, 3,3'-diphenyl-4,4'-dihydroxydiphenyl sulfide, 4,4'-dihydroxydiphenyl sulfoxide, 3,3'-dimethyl-4,4'-dihydroxydiphenyl sulfoxide, 4,4'-dihydroxydiphenyl sulfone, 4,4'-dihydroxy-3,3'-dimethyldiphenyl sulfone, bis(4-hydroxyphenyl)ketone, bis(4-hydroxy-3-methylphenyl)ketone, 7,7'-dihydroxy-3,3',4,4'-tetrahydro-4,4,4',4'-tetramethyl-2,2'-spirobi (2H-1-benzopyran), trans-2,3-bis(4-hydroxyphenyl)-2-butene, 9,9-bis(4-hydroxyphenyl)fluorene, 3,3-bis(4-hydroxyphenyl)-2-butanone, 1,6-bis(4-hydroxyphenyl)-1,6-hexanedione, 4,4'-dihydroxybiphenyl, m-dihydroxyxylylene, p-dihydroxyxylylene, 1,4-bis(2-hydroxyethyl)benzene, 1,4-bis(3-hydroxypropyl)benzene, 1,4-bis(4-hydroxybutyl)benzene, 1,4-bis(5-hydroxypentyl)benzene, 1,4-bis(6-hydroxyhexyl)benzene, 2,2-bis[4-(2"-hydroxyethyloxy)phenyl]propane, hydroquinone, and resorcin.

Polyfunctional polyols (corresponding to the component (CB)) such as trihydroxynaphthalene, tetrahydroxynaphthalene, benzenetriol, biphenyltetraol, pyrogallol, (hydroxynaphthyl)pyrogallol, and trihydroxyphenanthrene.

[Polyester Polyol: Component (C)]

Examples of the polyester polyol include a compound obtained by a condensation reaction between a polyol and a compound having a plurality of carboxylic acids. Among them, the number average molecular weight is preferably 400 to 2000, more preferably 500 to 1500, and most preferably 600 to 1200. In addition, those having hydroxy groups only at both terminals of the molecule (two hydroxy groups in the molecule) correspond to the component (C11) constituting the component (B1), and those having three or more hydroxy groups in the molecule correspond to the component (CB).

Here, examples of the polyol include ethylene glycol, 1,2-propanediol, 1,3-butanediol, 1,4-butanediol, 3-methyl-1,5-pentanediol, 1,6-hexanediol, 3,3'-dimethylolheptane, 1,4-cyclohexanedimethanol, neopentyl glycol, 3,3-bis(hydroxymethyl)heptane, diethylene glycol, dipropylene glycol, glycerin, and trimethylolpropane, and these may be used alone or in combination of two or more thereof. Examples of the compound having a plurality of carboxylic acids include succinic acid, adipic acid, azelaic acid, sebacic acid, dodecanedicarboxylic acid, cyclopentanedicarboxylic acid, cyclohexanedicarboxylic acid, orthophthalic acid, isophthalic acid, terephthalic acid, and naphthalenedicarboxylic acid, and these may be used alone or in combination of two or more thereof.

These polyester polyols are commercially available as reagents or industrially, and examples of commercially available products include "POLYLITE (registered trademark)" series manufactured by DIC Corporation, "Nippolan (registered trademark)" series manufactured by Nippon Polyurethane Industry Co., Ltd., "MAXIMOL (registered trademark)" series manufactured by Kawasaki Kasei Chemicals Ltd., and "Kuraray polyol (registered trademark)" series manufactured by Kuraray Co., Ltd.

[Polyether Polyol; Component (C)]

Examples of the polyether polyol include a compound obtained by ring-opening polymerization of an alkylene oxide or a reaction between a compound having two or more active hydrogen groups in the molecule and an alkylene oxide, and a modified product thereof. Among them, the number average molecular weight is preferably 400 to 2000, more preferably 500 to 1500, and most preferably 600 to 1200. In addition, those having hydroxy groups only at both terminals of the molecule (two hydroxy groups in the molecule) correspond to the component (C11) constituting the component (B1), and those having three or more hydroxy groups in the molecule correspond to the component (CB).

Examples of the polyether polyol may include a polymer polyol, a urethane-modified polyether polyol, and a polyether ester copolymer polyol. Examples of the compound having two or more active hydrogen groups in the molecule include water and polyol compounds such as glycol and glycerin having one or more hydroxy groups in the molecule such as ethylene glycol, propylene glycol, butanediol, glycerin, trimethylolpropane, hexanetriol, triethanolamine, diglycerin, pentaerythritol, trimethylolpropane, and hexanetriol, and these may be used alone or in combination of two or more thereof.

Examples of the alkylene oxide include cyclic ether compounds such as ethylene oxide, propylene oxide, and tetrahydrofuran, and these may be used alone or in combination of two or more thereof.

Such polyetherpolyols are available as reagents or industrially, and examples of commercially available products include "EXCENOL (registered trademark)" series and "EMULSTAR (registered trademark)" manufactured by AGC Inc., and "Adeka polyether" series manufactured by ADEKA CORPORATION.

[Polycaprolactone Polyol; Component (C)]

Examples of the polycaprolactone polyol include compounds obtained by ring-opening polymerization of e-caprolactone. Among them, the number average molecular weight is preferably 400 to 2000, more preferably 500 to 1500, and most preferably 600 to 1200. In addition, those having hydroxy groups only at both terminals of the molecule (two hydroxy groups in the molecule) correspond to the component (C11) constituting the component (B1), and those having three or more hydroxy groups in the molecule correspond to the component (CB).

These polycaprolactone polyols are available as reagents or industrially, and examples of commercially available products include "PLACCEL (registered trademark)" series manufactured by Daicel Corporation.

[Polycarbonate Polyol; Component (C)]

Examples of the polycarbonate polyol include compounds obtained by phosgenating one or more low molecular weight polyols, and compounds obtained by transesterification using ethylene carbonate, diethyl carbonate, diphenyl carbonate, or the like. Among them, the number average molecular weight is preferably 400 to 2000, more preferably 500 to 1500, and most preferably 600 to 1200. In addition, those having hydroxy groups only at both terminals of the molecule (two hydroxy groups in the molecule) correspond to the component (C11) constituting the component (B1), and those having three or more hydroxy groups in the molecule correspond to the component (CB).

Examples of the low molecular weight polyol include low molecular weight polyols such as ethylene glycol, 1,2-propanediol, 1,3-propanediol, 2-methyl-1,3-propanediol, 1,2-butanediol, 1,3-butanediol, 1,4-butanediol, 1,5-pentanediol, 1,6-hexanediol, 1,8-octanediol, 1,9-nonanediol, 1,10-decanediol, 3-methyl-1,5-pentanediol, 2-ethyl-4-butyl-1,3-propanediol, diethylene glycol, dipropylene glycol, neopentyl glycol, cyclohexane-1,4-diol, cyclohexane-1,4-dimethanol, dimer acid diol, ethylene oxide or propylene oxide adduct of bisphenol A, bis(8-hydroxyethyl)benzene, xylylene glycol, glycerin, trimethylolpropane, and pentaerythritol.

[Polyacryl Polyol; Component (C)]

Examples of the polyacryl polyol include polyol compounds obtained by polymerizing a (meth)acrylate acid ester or a vinyl monomer. In addition, those having hydroxy groups only at both terminals of the molecule (two hydroxy groups in the molecule) correspond to the component (C11) constituting the component (B1), and those having three or more hydroxy groups in the molecule correspond to the component (CB).

[Castor Oil-Based Polyol; Component (C)]

Examples of the castor oil-based polyol include polyol compounds using castor oil, which is a natural oil and fat, as a starting material. In addition, those having hydroxy groups only at both terminals of the molecule (two hydroxy groups in the molecule) correspond to the component (C11) constituting the component (B1), and those having three or more hydroxy groups in the molecule correspond to the component (CB).

These castor oil polyols are available as reagents or industrially, and examples of commercially available products include "URIC (registered trademark)" series manufactured by Itoh Oil Chemicals Co., Ltd.

[(C) Compound Having Two or More Thiol Groups; Component (C)]

Specific examples of suitable compounds having thiol groups in the component (C) include those described in WO 2015/068798. Among them, particularly preferable examples include the following.

Tetraethylene glycol bis(3-mercaptopropionate), 1,4-butanediol bis(3-mercaptopropionate), 1,6-hexanediol bis(3-mercaptopropionate), and 1,4-bis(mercaptopropylthiomethyl)benzene (corresponding to the component (C11) constituting the component (B1)).

Thiols (corresponding to the component (CB)) such as trimethylolpropane tris(3-mercaptopropionate), pentaerythritol tetrakis(3-mercaptopropionate), dipentaerythritol hexakis(3-mercaptopropionate), 1,2-bis[(2-mercaptoethyl)thio]-3-mercaptopropane, 2,2-bis(mercaptomethyl)-1,4-butanedithiol, 2,5-bis(mercaptomethyl)-1,4-dithiane, 4-mercaptomethyl-1,8-dimercapto-3,6-dithiaoctane, 1,1,1,1-tetrakis(mercaptomethyl)methane, 1,1,3,3-tetrakis(mercaptomethylthio)propane, 1,1,2,2-tetrakis(mercaptomethylthio)ethane, 4,6-bis(mercaptomethylthio)-1,3-dithiane, and tris-{(3-mercaptopropionyloxy)ethyl}isocyanurate.

[OH/SH-Type Polymerizable Group-Containing Monomer; Component (C)]

Examples of the compound having both a hydroxy group and a thiol group in the component (C) include the following compounds.

2-mercaptoethanol, 1-hydroxy-4-mercaptocyclohexane, 2-mercaptohydroquinone, 4-mercaptophenol, 1-hydroxyethylthio-3-mercaptoethylthiobenzene, 4-hydroxy-4'-mercaptodiphenylsulfone, 2-(2-mercaptoethylthio)ethanol, dihydroxyethylsulfide mono(3-mercaptopropionate), and dimercaptoethane mono(salicylate) (corresponding to the component (C11) constituting the component (B1)).

Polyfunctional OH/SH-type polymerizable group-containing monomers (corresponding to the component (CB)) such as 3-mercapto-1,2-propanediol, glycerin di(mercaptoacetate), 2,4-dimercaptophenol, 1,3-dimercapto-2-propanol, 2,3-dimercapto-1-propanol, 1,2-dimercapto-1,3-butanediol, pentaerythritol tris(3-mercaptopropionate), pentaerythritol mono(3-mercaptopropionate), pentaerythritol bis(3-mercaptopropionate), pentaerythritol tris(thioglycolate), pentaerythritol pentakis(3-mercaptopropionate), hydroxymethyl-tris(mercaptoethylthiomethyl)methane, and hydroxyethylthiomethyl-tris(mercaptoethylthio)methane.

[Side Chain-Containing Cyclic Molecule Having Three or More Hydroxy Groups and/or Thiol Groups; Component (CB)]

The side chain-containing cyclic molecule is not particularly limited as long as it is a cyclic molecule having three or more side chains each having a hydroxy group and/or a thiol group at a terminal thereof. Examples of the cyclic molecule include cyclodextrin, crown ether, benzocrown, dibenzocrown, dicyclohexanocrown, cyclobis(paraquat-1,4-phenylene), dimethoxypillarlarene, calixarene, and phenanthroline, and among these, cyclodextrin is preferable.

The cyclodextin includes an a-form (ring internal diameter: 0.45 to 0.6 nm), a B-form (ring internal diameter: 0.6 to 0.8 nm), and a y-form (ring internal diameter: 0.8 to 0.95 nm). Mixtures of these may also be used. In the present invention, α-cyclodextrin and 8-cyclodextrin are particularly preferable.

Next, the side chain having a hydroxy group and/or a thiol group at the terminal, which is introduced into the cyclic molecule in an amount of at least 3 or more, will be described. The method for introducing the side chain is not limited, and the side chain can be introduced, for example, by modifying a reactive functional group of the cyclic molecule (that is, the side chain is introduced by reacting with the reactive functional group).

Examples of the reactive functional group include a hydroxy group and an amino group, and among these, a hydroxy group is preferable. For example, α-cyclodextrin has 18 OH groups (hydroxy groups) as reactive functional groups, and a side chain is introduced by reacting with these OH groups. Therefore, a maximum of 18 side chains can be introduced into one a-cyclodextrin. In the present invention, in order to sufficiently exhibit the function of the side chain described above, at least three or more side chains having a hydroxy group and/or a thiol group introduced at the terminal thereof are required to be introduced. Above all, five or more side chains having a hydroxy group and/or a thiol group introduced at the terminal thereof are preferably introduced, seven or more side chains having a hydroxy group and/or a thiol group introduced at the terminal thereof are more preferably introduced, and eight or more side chains having a hydroxy group and/or a thiol group introduced at the terminal thereof are most preferably introduced. Particularly preferred is a side chain having a hydroxy group at the terminal.

The side chain is not particularly limited, but is preferably formed by repetition of an organic chain having 3 to 20 carbon atoms. The number average molecular weight of such a side chain is preferably, for example, 300 or more. More specifically, the number average molecular weight of such a side chain is in the range of 300 to 10000, preferably 350 to 5000, and most preferably 400 to 5000. The number average molecular weight of the side chain can be adjusted by the amount used at the time of introduction of the side chain, can be obtained by calculation, and can also be obtained by measurement of 1H-NMR.

When the lower limit of the number average molecular weight of the side chain is set as described above, excellent mechanical properties are exhibited, and the polishing rate tends to be improved when used in the CMP polishing pad of the present invention.

In the present invention, the side chain may be linear or branched. For the introduction of the side chain, a method or a compound disclosed in WO 2015/159875 can be appropriately introduced, and for example, ring-opening polymerization; radical polymerization; cationic polymerization; anionic polymerization; and living radical polymerization such as atom transfer radical polymerization, RAFT polymerization, and NMP polymerization can be used. By reacting an appropriately selected compound with the reactive functional group of the cyclic molecule by the above method, a side chain having an appropriate size can be introduced.

Among them, ring-opening polymerization is particularly preferable, and it is suitable to react a cyclic compound such as cyclic ether, cyclic lactone, cyclic acetal, or cyclic carbonate with a reactive functional group of a cyclic molecule to introduce a side chain derived from the cyclic compound into the cyclic molecule.

Among the cyclic compounds, cyclic ethers, cyclic lactones, and cyclic carbonates are preferably used from the viewpoint of high reactivity and easy adjustment of molecular weight.

Examples of the cyclic ether, the cyclic lactone, and the cyclic carbonate which are suitably used are described below.

[Cyclic Ether]

Ethylene oxide, 1,2-propylene oxide, epichlorohydrin, epibromohydrin, 1,2-butylene oxide, 2,3-butylene oxide, isobutylene oxide, oxetane, 3-methyloxetane, 3,3-dimethyloxetane, tetrahydrofuran, 2-methyltetrahydrofuran, 3-methyltetrahydrofuran, and the like.

[Cyclic Lactone]

4-membered ring lactones such as B-propiolactone, δ-methylpropiolactone, and L-serine-B-lactone.

5-membered ring lactones such as γ-butyrolactone, γ-hexanolactone, γ-heptanolactone, γ-octanolactone, γ-decanolactone, γ-dodecanolactone, α-hexyl-γ-butyrolactone, α-heptyl-γ-butyrolactone, α-hydroxy-γ-butyrolactone, γ-methyl-γ-decanolactone, α-methylene-γ-butyrolactone, α,α-dimethyl-γ-butyrolactone, D-erythronolactone, α-methyl-γ-butyrolactone, γ-nonanolactone, DL-pantolactone, γ-phenyl-γ-butyrolactone, γ-undecanolactone, γ-valerolactone, 2,2-pentamethylene-1,3-dioxolane-4-one, α-bromo-γ-butyrolactone, γ-crotonolactone, α-methylene-γ-butyrolactone, α-methacryloyloxy-γ-butyrolactone, and β-methacryloyloxy-γ-butyrolactone.

6-membered ring lactones such as δ-valerolactone, δ-hexanolactone, δ-octanolactone, δ-nonanolactone, δ-decanolactone, δ-undecanolactone, δ-dodecanolactone, δ-tridecanolactone, δ-tetradecanolactone, DL-mevalonolactone, 4-hydroxy-1-cyclohexanecarboxylic acid δ-lactone, monomethyl-δ-valerolactone, monoethyl-δ-valerolactone, monohexyl-δ-valerolactone, 1,4-dioxan-2-one, and 1,5-dioxepan-2-one.

7-membered ring lactones such as e-caprolactone, monomethyl-ε-caprolactone, monoethyl-ε-caprolactone, monohexyl-ε-caprolactone, dimethyl-ε-caprolactone, di-n-propyl-ε-caprolactone, di-n-hexyl-ε-caprolactone, trimethyl-E-caprolactone, triethyl-ε-caprolactone, tri-n-ε-caprolactone, ε-caprolactone, 5-nonyl-oxepan-2-one, 4,4,6-trimethyl-oxepan-2-one, 4,6,6-trimethyl-oxepan-2-one, and 5-hydroxymethyl-oxepan-2-one.

δ-membered ring lactones such as ζ-enantholactone.

Other lactones such as lactone, lactide, dilactide, tetramethylglycoside, 1,5-dioxepan-2-one, and t-butylcaprolactone.

[Cyclic Carbonate]

Ethylene carbonate, propylene carbonate, 1,2-butylene carbonate, glycerol 1,2-carbonate, 4-(methoxymethyl)-1,3-dioxolane-2-one, (chloromethyl)ethylene carbonate, vinylene carbonate, 4,5-dimethyl-1,3-dioxole-2-one, 4-chloromethyl-5-methyl-1,3-dioxole-2-one, 4-vinyl-1,3-dioxolane-2-one, 4,5-diphenyl-1,3-dioxolane-2-one, 4,4-dimethyl-5-methylene-1,3-dioxolane-2-one, 1,3-dioxane-2-one, 5-methyl-5-propyl-1,3-dioxolane-2-one, and 5,5-diethyl-1,3-dioxolane-2-one.

These cyclic compounds may be used alone or in combination of two or more thereof.

The cyclic compound suitably used in the present invention is a lactone compound, and particularly suitable lactone compounds are lactone compounds such as ε-caprolactone, α-acetyl-γ-butyrolactone, α-methyl-γ-butyrolactone, γ-valerolactone, and γ-butyrolactone, and ε-caprolactone is most preferred.

In addition, when a cyclic compound is reacted by ring-opening polymerization to introduce a side chain, a reactive functional group (for example, a hydroxy group) of a cyclic molecule is poor in reactivity, and it may be difficult to directly react a large molecule particularly due to steric hindrance or the like. In such a case, for example, in order to react with the above-mentioned caprolactone or the like, a method in which a low molecular weight compound such as propylene oxide is once reacted with the reactive functional group of the cyclic molecule for hydroxypropylation to introduce a highly reactive functional group in advance is suitable. Thereafter, a means of introducing a side chain by ring-opening polymerization using the above-mentioned cyclic compound can be adopted. In this case, the hydroxypropylated moiety can also be regarded as a side chain.

[Polyrotaxane Having a Hydroxy Group and/or a Thiol Group; Component (C)]

The polyrotaxane is a composite of molecules having a structure in which a chain-like axis molecule penetrates through the rings of a plurality of cyclic molecules, and bulky groups are bonded to both terminals of the axis molecule so that the cyclic molecules cannot be removed from the axis molecule due to steric hindrance, and is also called a supramolecule. The polyrotaxane that can be used as the component (C) of the present invention is a polyrotaxane having a hydroxy group and/or a thiol group polymerizable with an isocyanate group, and a polyrotaxane having three or more hydroxy groups and/or thiol groups corresponds to the component (CB). The polyrotaxane having a hydroxy group and/or a thiol group used as the component (C) of the present invention is not particularly limited, but examples thereof include polyrotaxanes described in WO 2018/092826.

Preferable examples of the component (CB) used in the present invention include glycerin, trimethylolethane, trimethylolpropane, ditrimethylolpropane, trimethylolpropane tripolyoxyethylene ether (TMP-30 manufactured by Nippon Nyukazai Co., Ltd.), polyester polyols having three or more hydroxy groups, polyether polyols having three or more hydroxy groups, castor oil-based polyols having three or more hydroxy groups, side chain-containing cyclic molecules having three or more hydroxy groups, and polyrotaxanes having a hydroxy group and/or a thiol group, a side chain-containing cyclic compound having three or more hydroxy groups and a polyrotaxane having three or more hydroxy groups and/or thiol groups are more preferred, and from the viewpoint of handling property, a side chain-containing cyclic compound having three or more hydroxy groups is most preferred.

<Blending Proportion of Component (B) and Component (C)>

In the present invention, the blending proportion of the component (B) and the component (C) is not particularly limited. Above all, in order to exhibit an excellent effect, the total number of moles of the active hydrogen groups of the component (C) is preferably 0.8 to 2.0 moles when the total of the iso(thio)cyanate groups of the component (B) is 1 mole. When the amount of the iso(thio)cyanate group is too large or too small, in the obtained polyurethane resin, curing failure is likely to occur, and abrasion resistance tends to decrease. In order to obtain a polyurethane resin having a better cured state, a uniform state, and excellent abrasion resistance, the total number of moles of the active hydrogen groups is more preferably 0.85 to 1.75 moles, and still more preferably 0.9 to 1.5 moles, when the total of the iso(thio)cyanate groups is 1 mole. When (CA) a compound having two or more amino groups is used in calculating the total number of moles of active hydrogen groups in the component (C), the number of moles of active hydrogen in the compound having two or more amino groups is assumed to be equal to the number of moles of amino groups.

In the present invention, in order to exhibit excellent polishing characteristics, as described above, the component (C) preferably contains the component (CA), and more preferably further contains the component (CA) and the component (CB).

That is, in the present invention, the composition for producing the polyurethane resin preferably contains the component (B) and the component (CA), and more preferably contains the component (B), the component (CA), and the component (CB).

For example, in a case where the composition contains the component (B), the component (CA), and the component (CB), the respective blending proportions thereof are, per 100 parts by mass of the total of the component (B), the component (CA), and the component (CB), preferably 60 to 95 parts by mass of the component (B), 2 to 20 parts by mass of the component (CA), and 1 to 30 parts by mass of the component (CB) and more preferably 70 to 85 parts by mass of the component (B), 2 to 15 parts by mass of the component (CA), and 3 to 25 parts by mass of the component (CB).

<Other Blending Components>

As other blending components used in the present invention, various known blending agents can be used as long as the effects of the present invention are not impaired. For example, a curing catalyst, abrasive grains, a surfactant, a flame retardant, a plasticizer, a filler, an antistatic agent, a foam stabilizer, a solvent, a leveling agent, and other additives may be added. These additives may be used alone or in combination of two or more thereof.

As the curing catalyst, a reaction catalyst for urethane or urea may be used in order to rapidly accelerate the curing. Specific examples of the reaction catalyst for urethane or urea that can be suitably used in the present invention include those described in WO 2015/068798.

These reaction catalysts for urethane or urea may be used alone or in combination of two or more thereof, and the amount thereof used may be a so-called catalytic amount, for example, in the range of 0.001 to 10 parts by mass, particularly 0.01 to 5 parts by mass, per 100 parts by mass of the total of the component (B) and the component (C).

Examples of the abrasive grains include particles made of a material selected from cerium oxide, silicon oxide, alumina, silicon carbide, zirconia, iron oxide, manganese dioxide, titanium oxide, and diamond, and particles made of two or more kinds of these materials.

EXAMPLES

Next, the present invention will be described in detail with reference to Examples and Comparative Examples, but the present invention is not limited to these Examples. The components and evaluation method used in the following Examples and Comparative Examples are as follows.

[Evaluation Method]

Electron micrographs of the obtained fine hollow particles were measured with a field emission-type scanning electron microscope (manufactured by JEOL Ltd., JSM-7800FPrime), and image analysis software ImageJ (National Institutes of Health) was used.

Example 1

Figure 2:
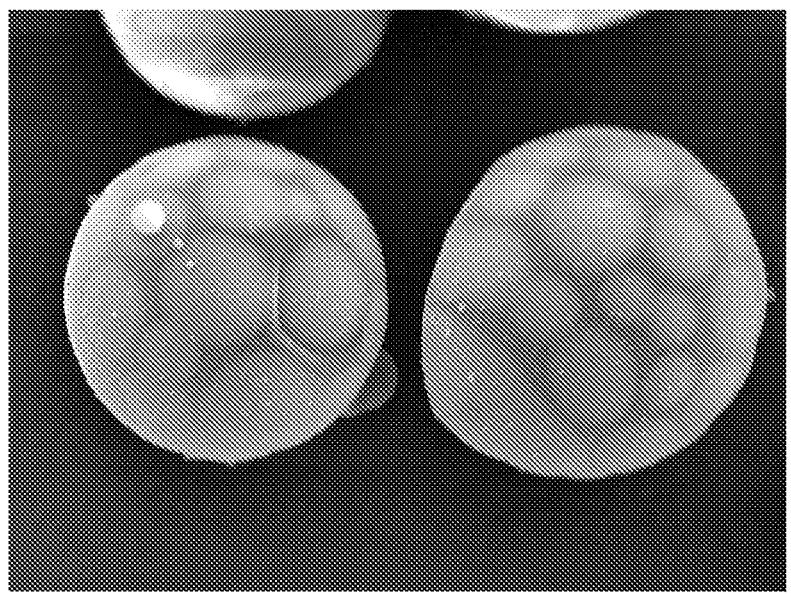
FIG. 2 is a field emission-type scanning electron microscope image of the fine hollow particles obtained in Example 1.

As a water phase, 1.5 g of an ethylene-maleic anhydride copolymer (average molecular weight: 100,000 to 500,000, manufactured by ALDRICH) as a surfactant was dissolved in 50 g of distilled water under heating, and then the pH was adjusted using 5 mL of a 10% sodium hydroxide aqueous solution to prepare an acidic aqueous solution of pH 4 at 65° C. 20 g of toluene was added to the water phase as an oil phase, and the mixture was stirred at 1500 rpm for 10 minutes to prepare an O/W emulsion of pH 4 at 45° C. Further, as an additional phase, 4.54 g of melamine, 11.69 mL of 37% formaldehyde aqueous solution, and 7.12 g of distilled water were mixed at 70° C., and then the pH was adjusted using 5 mL of a 10% sodium hydroxide aqueous solution to cause an addition reaction of formaldehyde to melamine. Next, an alkaline aqueous solution of methylolated melamine of pH 12 at 70° C. was prepared, and then added and mixed to the O/W emulsion obtained above. Thereafter, a 10% citric acid aqueous solution was added to confirm that the pH value became 4 or less, and the mixture was allowed to react for 3 hours at a liquid temperature of 80° C. while stirring and mixing at 300 rpm to produce fine particles. Then, the obtained fine particles were subjected to centrifugal separation, centrifugal separation was performed 10 times at 8000 rpm for 15 minutes to remove the water phase, and then vacuum drying was performed for 48 hours to obtain fine hollow particles having a hollow inside. As shown in FIG. 2, when the obtained fine hollow particles were observed with a field emission-type scanning electron microscope, it was confirmed that the fine hollow particles were characterized in that the resin film was composed of a plurality of small piece-shaped portions and a bonding portion for bonding the plurality of small piece-shaped portions. As a result of image analysis, the average particle diameter of the fine hollow particles was 23.8 µm, and the standard deviation of the particle diameter was 6.9. In addition, the longest diameter of the small piece-shaped portion was 9 µm. Further, as shown in FIG. 2, the appearance of the obtained fine hollow particles was good. The bulk density of the obtained fine hollow particles was 0.3 g/cm$^3$. Table 1 shows the components used and the results.

Comparative Example 1

Figure 3:
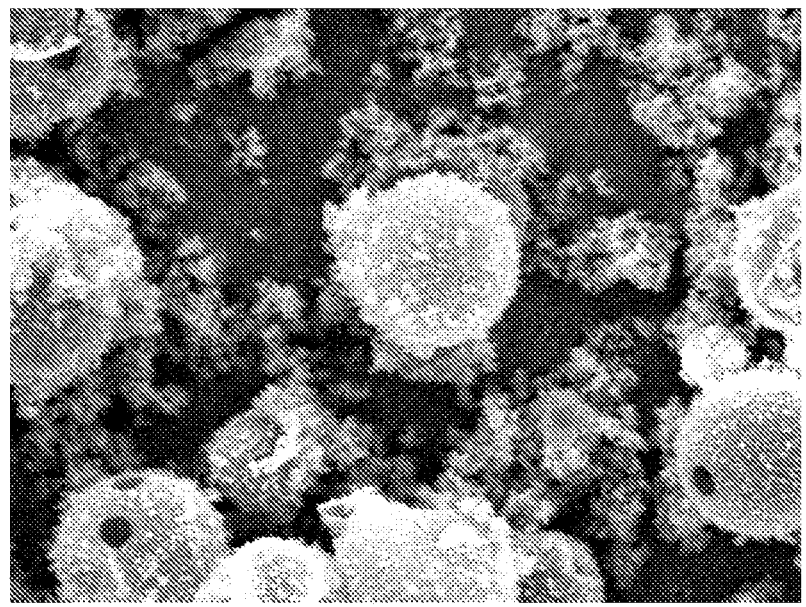
FIG. 3 is a field emission type scanning electron microscope image of the fine hollow particles obtained in Comparative Example 1.

Fine hollow particles were produced in the same manner as in Example 1 except that the blending amounts shown in Table 1 were used. As a result of observing the obtained fine hollow particles by a field emission-type scanning electron microscope, it was confirmed that the resin film did not have a specific structure and the particle was a normal fine hollow body. As a result of image analysis, the average particle diameter was 28.1 µm, and the standard deviation was 8.1. Further, from FIG. 3, holes were observed in the appearance of the obtained fine hollow particles. The bulk density of the obtained fine hollow particles was 0.3 g/cm$^3$. The results are shown in Table 1.

TABLE 1

| | | Example 1 | Comparative Example 1 |
|---|---|---|---|
| Continuous phase (water phase) | Ethylene-maleic anhydride copolymer (g) | 1.5 | 1.5 |
| | Distilled water (g) | 50 | 200 |
| | 10 wt % NaOH (mL) | 5 | 5 |
| Dispersed phase (oil phase) | Toluene (g) | 20 | 20 |
| Additional phase | Melamine (g) | 4.54 | 4.54 |
| | 37 wt % formaldehyde (mL) | 11.69 | 11.69 |
| | Distilled water (g) | 7.12 | 7.12 |
| | 10 wt % NaOH (mL) | 5 | 5 |
| pH adjustment | 10 wt % citric acid (mL) | 15 | 15 |
| Average particle diameter (µm) | | 23.8 | 28.1 |
| Standard deviation | | 6.9 | 8.1 |
| Appearance | | Good | Poor |

In the fine hollow particles of Example 1, as described above, the resin film was composed of a plurality of small piece shaped portions and a bonding portion that bonds the plurality of small piece shaped portions. Further, since the resin film of the fine hollow particles of Example 1 was a melamine-based resin, the particles were excellent in heat resistance and solvent resistance, the average particle diameter was as large as 23.8 µm, the standard deviation of the particle diameter was as small as 6.9, and the dispersibility was excellent. Further, the appearance was also good, and the stability was excellent.

On the other hand, in the fine hollow particles of Comparative Example 1, a small piece-shaped portion was not observed. The standard deviation of the particle diameter of the fine hollow particles of Comparative Example 1 was 8.1, which was a larger value than that of the fine hollow particles of Example 1, and the dispersibility was poor. Furthermore, holes were observed in the appearance, and the stability was poor.

<Component (B)>

Pre.1: a terminal isocyanate urethane prepolymer having an iso(thio)cyanate equivalent of 905; component (B1)

(Production Method of Pre-1)

In a flask equipped with a nitrogen inlet tube, a thermometer, and a stirrer, 50 g of 2,4-tolylene diisocyanate, 90 g of polyoxytetramethylene glycol (number average molecular weight: 1000), and 12 g of diethylene glycol were reacted at 80° C. for 6 hours in a nitrogen atmosphere to obtain a terminal isocyanate urethane prepolymer (Pre-1) having an iso(thio)cyanate equivalent of 905.

<Component (C)>

CB-1: A Cyclic Molecule Having Nine Hydroxy Groups at Side Chain Terminals; Component (CB)

(Production Method of CB-1)

10 g of hydroxypropylated B-cyclodextrin (CycloChem Co., Ltd.) and 32.0 g of ε-caprolactone were stirred at 130° C. under a flow of dry nitrogen gas to make a uniform solution, and then 0.04 g of tin (II) 2-ethylhexanoate was added thereto and reacted for 16 hours to obtain a cyclic molecule (CB-1) having nine hydroxy groups at the side chain terminals as a target product. The physical properties of CB-1 were as follows.

Weight average molecular weight Mw (GPC): 4800
  Degree of dispersion (GPC): 1.05
Degree of modification of the side chain: 0.43 (43% expressed as %)
Polymerizable group at side chain terminal: hydroxy group
Number of side chains introduced into cyclic molecule: 9

Molecular weight of side chain: about 550 in terms of number average molecular weight Viscosity: 3800 mPa·s Amount of remaining tin: 300 ppm

[Measurement Method]

(1) Density:

The density (g/cm³) was measured with (DSG-1) manufactured by Toyo Seiki Seisaku-sho, Ltd.

(2) Shore D Hardness:

The Shore D hardness was measured with a durometer manufactured by Kobunshi Keiki Co., Ltd. in accordance with JIS standard (hardness test) K 6253. The thickness was measured by overlapping so as to be 6 mm. The relatively low hardness was measured by the Shore A hardness, and the relatively high hardness was measured by the Shore D hardness.

(3) Hysteresis Loss:

A resin punched out in the shape of dumbbell No. 8 having a thickness of 2 mm was stretched by 20 mm at a rate of 10 mm/min with an autograph of AG-SX manufactured by Shimadzu Corporation, and the hysteresis loss was measured when the stress was returned to 0.

(4) Polishing rate:

The polishing rate when the polishing was performed under the following conditions was measured. The polishing rate is an average value of three 2-inch sapphire wafers.

CMP polishing pad: A pad having a size of 300 mm φ and a thickness of 1 mm, in which concentric grooves are formed on the surface.

Slurry: FUJIMI COMPOL-80 stock solution manufactured by Fujimi Incorporated

Pressure: 0.7 psi

Rotational speed: 45 rpm

Time: 1 hour (5) Scratch:

The presence or absence of scratches on the wafers polished under the conditions described in (4) above was observed. The evaluation was performed according to the following criteria.

1: None of the three wafers was scratched by observation of a laser microscope.

2: Only one wafer was scratched by observation of a laser microscope.

3: Two of the three wafers were found to have scratches by observation of a laser microscope.

4: All of the three wafers were found to have scratches by observation of a laser microscope.

Example 2

12.5 parts by mass of CB-1 as the above-produced component (CB) and 5.7 parts by mass of 4,4'-methylenebis(o-chloroaniline) (MOCA) as the component (CA) were mixed at 120° C. to make a uniform solution, followed by sufficient deaeration to prepare a liquid A. Separately, 10 parts by mass of the fine hollow particles of Example 1 was added to 81.8 parts by mass of Pre-1 of the above-produced component (B1) heated to 70° C., and the mixture was stirred with a rotation and revolution stirrer to prepare a liquid B as a uniform solution. The liquid A was added to and uniformly mixed with the liquid B prepared above to obtain a curable composition. The curable composition was injected into a mold, defoamed under a reduced pressure of 5 kPa for 2 minutes, and then cured at 100° C. for 15 hours. After completion of the curing, the cured product was removed from the mold to obtain a cured body.

Next, the obtained cured body was sliced to prepare cured bodies having a thickness of 2 mm and a thickness of 1 mm. Using the cured body having a thickness of 2 mm obtained by slicing, the above-described various physical properties were measured. The obtained cured body had a density of 1.0 g/cm³, a Shore D hardness of 32 D, and a hysteresis loss of 25%.

On the other hand, a spiral groove was formed on the surface of the cured body having a thickness of 1 mm obtained by slicing, and a double-sided tape was attached to the back surface, thereby obtaining a polishing pad made of a cured body having a size of 300 mmφ and a thickness of 1 mm.

The polishing rate of the polishing pad made of the cured body obtained above was 1.7 μm/hr, and the evaluation of scratch was rated as 1. The results are shown in Table 2.

Comparative Example 2

A cured body was produced in the same manner as in Example 2, except that 0.8 parts by mass of commercially available Microcapsule 920-40 (manufactured by Japan Fillite Co., Ltd., fine hollow particles composed of an acrylonitrile resin having a surface coated with inorganic powder) was used instead of the fine hollow particles of Example 2, and the obtained cured body had a density of 0.8 g/cm³, a Shore D hardness of 24 D, and a hysteresis loss of 31%. In addition, the fine hollow particles used in Comparative Example 2 did not have a small piece-shaped portion in the resin film.

Comparative Example 3

A cured body was produced in the same manner as in Example 2 except that the fine hollow particles of Comparative Example 1 were used instead of the fine hollow particles of Example 2, and the obtained cured body had a density of 1.05 g/cm³, a Shore D hardness of 33 D, and a hysteresis loss of 27%. In addition, the fine hollow particles used in Comparative Example 3 did not have a small piece-shaped portion in the resin film.

On the other hand, a spiral groove was formed on the surface of the cured body having a thickness of 1 mm obtained by slicing, and a double-sided tape was attached to the back surface, thereby obtaining a polishing pad made of a cured body having a size of 300 mmφ and a thickness of 1 mm.

The polishing rate of the polishing pad made of the cured body obtained above was 1.2 μm/hr, and the evaluation of scratch was rated as 1. The results are shown in Table 2.

TABLE 2

| | Evaluation results | | | | |
|---|---|---|---|---|---|
| | Density (g/cm³) | D hardness | Hysteresis loss (%) | Polishing rate (μm/hr) | Scratch (nm) |
| Example 2 | 1.00 | 32 | 25 | 1.7 | 1 |
| Comparative Example 2 | 0.80 | 24 | 31 | 0.9 | 1 |
| Comparative Example 3 | 1.05 | 33 | 27 | 1.2 | 1 |

REFERENCE SIGNS LIST 1a, 1b: Fine hollow particles
2: Small piece-shaped portion
3: Bonding portion

The invention claimed is:

1. A fine hollow particle composed of a resin film comprising a melamine-based resin, wherein the resin film comprises a plurality of small piece-shaped portions and a bonding portion for bonding the plurality of small piece-shaped portions.

2. The fine hollow particle according to claim 1, wherein the small piece-shaped portion has at least one shape selected from the group consisting of a substantially circular plate shape, a substantially elliptical sphere shape, and a substantially spherical shape.

3. The fine hollow particle according to claim 1, wherein the small piece-shaped portion has a longest diameter of 1 µm to 20 µm.

4. The fine hollow particle according to claim 1, wherein the fine hollow particle composed of the resin film comprising the melamine-based resin has a particle diameter of 10 µm to 100 µm.

5. A cured body comprising the fine hollow particle according to claim 1 dispersed in a polyurethane resin.

6. A CMP polishing pad comprising the cured body according to claim 5.

7. A method for producing a fine hollow particle composed of a resin film comprising a melamine-based resin, the method comprising:

a first step: a step of preparing (a) an oil phase of an organic solvent;

a second step: a step of preparing (b) a water phase containing a surfactant;

a third step: a step of mixing and stirring the oil phase and the water phase to prepare an O/W emulsion in which the water phase forms a continuous phase and the oil phase forms a dispersed phase;

a fourth step: a step of adding a melamine formaldehyde prepolymer compound as an additional phase to the O/W emulsion and promoting a condensation reaction of methylolated melamine, which is a melamine formaldehyde prepolymer compound, on an interface of the O/W emulsion to form a resin film, forming a fine particle encapsulating the oil phase, and obtaining a fine particle dispersion liquid in which the fine particle is dispersed;

a fifth step: a step of separating the fine particle from the fine particle dispersion liquid; and a sixth step: a step of removing the oil phase from the inside of the fine particle to obtain the fine hollow particle, wherein a weight ratio of the (a) oil phase of the organic solvent to the (b) water phase containing the surfactant is 100 to 500 parts by mass of component (b), per 100 parts by mass of the component (a).

8. The method according to claim 7, wherein the organic solvent used in the (a) oil phase of the organic solvent is selected from organic solvents having a boiling point of 100° C. to 180° C.

* * * * *